Dec. 30, 1952     C. F. WEIGANDT     2,623,318

FISHING LURE

Original Filed Dec. 8, 1949

Carl F. Weigandt

*INVENTOR.*

BY *Clarence A. O'Brien and Harvey B. Jacobson*

*Attorneys*

Patented Dec. 30, 1952

2,623,318

UNITED STATES PATENT OFFICE 2,623,318

FISHING LURE

Carl F. Weigandt, Memphis, Tenn., assignor of forty-nine per cent to Wylie E. Turner, Jr., Piggott, Ark.

Original application December 8, 1949, Serial No. 114,545. Divided and this application September 19, 1951, Serial No. 247,293

1 Claim. (Cl. 43—42.09)

My invention relates to improvements in fish lures of the type simulating a bug, the instant application therefor being a division of my co-pending application for U. S. Letters Patent Serial No. 114,545, filed December 8, 1949, now Patent No. 2,571,980.

The primary object of my invention is to provide a fish lure of the type indicated in which the body is formed of a pair of opposed side-by-side sections for clamping leg simulating hairs, or bristles, therebetween, the sections being separable for replacement or interchanging and detachably secured together in a novel manner by the rear ends of fish hooks extending along the body and rearwardly thereof and anchored to the body against turning by simple inexpensive means obviating separate fasteners.

Other and subordinate objects, within the purview of my invention, together with the precise nature of my improvements will be readily understood when the succeeding description and claim are read with reference to the drawing accompanying and forming part of this specification.

Figure 1:
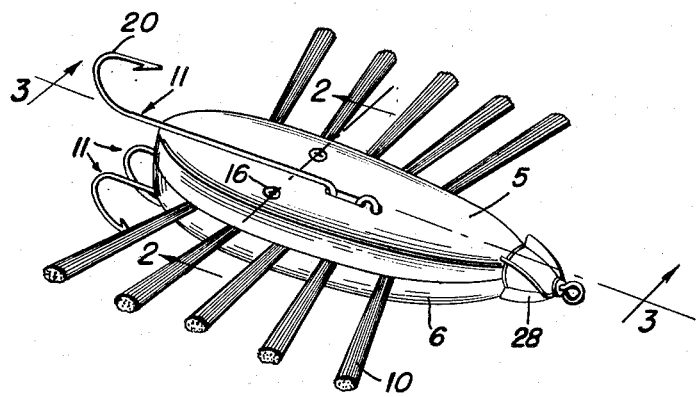
Figure 1 is a view in perspective of my improved fish lure in the preferred embodiment thereof.
Figure 2:
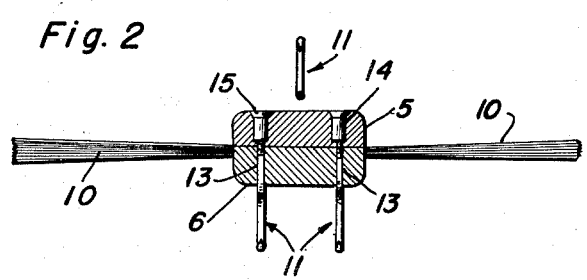
Figure 2 is a view in transverse section taken on the line 2—2 of Figure 1.
Figure 3:
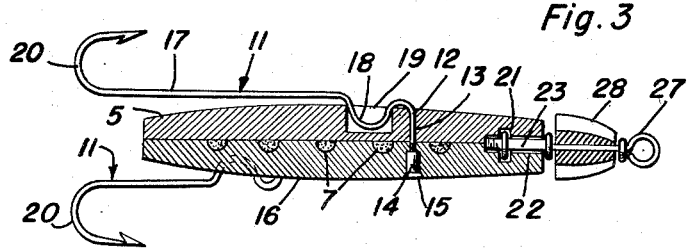
Figure 3 is a view in longitudinal section taken on the line 3—3 of Figure 1.

Referring to the drawing by numerals, the fish lure of my invention comprises a pair of flat, ovate, body sections 5, 6 positioned in side-by-side confronting relation with the outer edges rounded. The confronting side of section 6 is formed with transverse grooves 7 in which groups of leg simulating hairs, or bristles, 10 are clamped between said sections to extend from opposite sides of the body.

The body sections 5, 6 are detachably secured together by fish-hooks 11 having angular rear ends 12 inserted in vertical bores 13 in said sections 5, 6, said ends 12 being threaded to receive cylindrical nuts 14 having flared outer ends 15 countersunk in the body. The outer ends of the nuts 14 are formed with screw driver slots 16 for attaching or removing said nuts. The shank 17 of each fish-hook 11 extends longitudinally in a rearward direction from the ends 12, beyond the rear end of the body and is formed with a U-bend 18 adjacent its inner end seated in a longitudinal recess 19 in the body, which is to say the section 5, or 6, as the case may be. The bend 18 and recess 19 prevent the hook from turning or swinging and hold the bill 20 of the hook in rearwardly projecting position relative to the body. Both the top and bottom of the body may be provided with one or more of the hooks 11 with the bill 20 of the upper hook, or hooks, held upwardly and the bill 20 of the lower hook 20, or hooks, held downwardly.

A sleeve 23 held in mating grooves 21, 22 in the confronting faces of the sections 5, 6 at the front end of the body forms part of means for attaching to the front end of the body a spinner 28 and line attaching stem 27, and which need merely be mentioned in passing.

As will now be seen, the described hooks 11 and recesses 19 provide for easily and quickly securing together different colored, or ornamented, body sections 5, 6 in different color, or ornamented, combinations and with the bills of the hooks 11 trailing the body and held against turning by inexpensive and easily applied means simplifying attachment of the hooks to the body.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

Having described my invention, what is claimed as new is:

An artificial bait comprising a body composed of a pair of separable sections in side by side confronting relation, a fish-hook positioned against the outer side of the body with its bill portion projecting outwardly from the body, said hook having an angular inner end passing through the sections of the body, fastening means securing the inner end of the hook to the body and holding the sections in assembled relation to each other, said body having a recess in said outer side, and said hook having a U-bend spaced from said inner end thereof and seated in said recess to hold the hook from turning on the body.

CARL F. WEIGANDT.

REFERENCES CITED

The following references are of record in the file of this patent:

UNITED STATES PATENTS

| Number | Name | Date |
|---|---|---|
| 1,237,529 | Kuroki | Aug. 21, 1917 |
| 1,309,061 | Cassedy, Sr. | July 8, 1919 |
| 1,477,864 | Bolton | Dec. 18, 1923 |
| 1,929,150 | Peckinpaugh | Oct. 3, 1933 |
| 2,473,142 | Gilmore | June 14, 1949 |